(12) United States Patent
Pearce et al.

(10) Patent No.: US 7,636,349 B2
(45) Date of Patent: *Dec. 22, 2009

(54) SYSTEM AND METHOD FOR PROVIDING SHARED LINE APPEARANCES IN A DISTRIBUTED CALL ROUTING NETWORK

(75) Inventors: Christopher E. Pearce, Dallas, TX (US); Qing Jiang, Plano, TX (US); John D Alexander, Plano, TX (US); Kenneth P Pruski, Plano, TX (US); Roger V Beathard, McKinney, TX (US)

(73) Assignee: Cisco Technology, Inc., San Jose, CA (US)

( * ) Notice: Subject to any disclaimer, the term of this patent is extended or adjusted under 35 U.S.C. 154(b) by 269 days.

This patent is subject to a terminal disclaimer.

(21) Appl. No.: 11/559,443

(22) Filed: Nov. 14, 2006

(65) Prior Publication Data

US 2007/0127445 A1 Jun. 7, 2007

Related U.S. Application Data

(63) Continuation of application No. 09/579,348, filed on May 25, 2000.

(51) Int. Cl.
*H04L 12/66* (2006.01)
*H04L 12/28* (2006.01)
*H04M 11/00* (2006.01)
(52) U.S. Cl. .................. 370/352; 370/392; 379/93.01
(58) Field of Classification Search .............. 370/352, 370/401, 400, 389, 351, 392, 426, 395.2, 370/395.52, 354, 355, 356; 379/32.01, 32.04, 379/88.22, 121.01, 220.01, 112.05
See application file for complete search history.

(56) References Cited

U.S. PATENT DOCUMENTS

| | | | |
|---|---|---|---|
| 4,757,267 A | 7/1988 | Riskin | 379/113 |
| 5,430,792 A | 7/1995 | Jesurum et al. | 379/88.01 |
| 5,652,866 A | 7/1997 | Aldred et al. | 703/23 |
| 5,790,647 A | 8/1998 | Gessel | 379/216.01 |
| 5,867,494 A | 2/1999 | Krishnaswamy et al. | 370/352 |
| 5,950,198 A | 9/1999 | Falls et al. | 707/8 |
| 6,144,727 A | 11/2000 | Mashinsky | 379/112 |
| 6,161,008 A | 12/2000 | Lee et al. | 455/414 |

(Continued)

OTHER PUBLICATIONS

Cisco Systems, Inc.; "System Description for the Cisco Communications Network Version 2.1;" Cisco Communications Network; all, 1997.

*Primary Examiner*—Hanh Nguyen
(74) *Attorney, Agent, or Firm*—Baker Botts L.L.P.

(57) ABSTRACT

A method for routing calls in a packet-based network includes receiving a call request at a first call manager from a device that is coupled to the packet-based network. The call request includes a telephone number associated with a plurality of telephony devices that are coupled to the packet-based network and that are controlled by a number of call managers. The method also includes determining a line control process associated with the telephone number that is included in the call request and communicating the call request to the line control process. The method further includes determining a device process controlling each telephony device that is associated with the telephone number included in the call request and communicating the call request from the line control process to the device processes.

31 Claims, 8 Drawing Sheets

U.S. PATENT DOCUMENTS

| | | | |
|---|---|---|---|
| 6,205,214 B1 | 3/2001 | Culli et al. ................. 379/220 |
| 6,259,779 B1 | 7/2001 | Council et al. ......... 379/121.01 |
| 6,275,574 B1 | 8/2001 | Oran .......................... 379/201 |
| 6,282,194 B1 | 8/2001 | Cheesman et al. .......... 370/356 |
| 6,304,574 B1 | 10/2001 | Schoo et al. ................ 370/401 |
| 6,304,576 B1 | 10/2001 | Corley et al. ............... 370/408 |
| 6,324,173 B1 * | 11/2001 | Deschaine et al. ........... 370/352 |
| 6,353,610 B1 | 3/2002 | Bhattacharya et al. ...... 370/352 |
| 6,363,065 B1 | 3/2002 | Thornton et al. ............ 370/352 |
| 6,366,576 B1 | 4/2002 | Haga ......................... 370/352 |
| 6,389,130 B1 | 5/2002 | Shenoda et al. ........ 379/221.08 |
| 6,498,791 B2 | 12/2002 | Pickett et al. ............... 370/353 |
| 6,522,732 B1 | 2/2003 | Pullen et al. ........... 379/112.02 |
| 6,560,326 B1 | 5/2003 | Clark .................... 379/221.09 |
| 6,570,855 B1 | 5/2003 | Kung et al. ................. 370/237 |
| 6,574,012 B1 | 6/2003 | Kagawa ..................... 358/434 |
| 6,584,093 B1 | 6/2003 | Salama et al. ............... 370/351 |
| 6,597,687 B1 | 7/2003 | Rao ........................... 370/352 |
| 6,614,780 B2 | 9/2003 | Hakim et al. ............... 370/352 |
| 6,614,902 B1 | 9/2003 | Rizzetto ................ 379/265.11 |
| 6,657,989 B1 | 12/2003 | Hilsenrath .................. 370/351 |
| 6,671,262 B1 | 12/2003 | Kung et al. ................. 370/260 |
| 6,718,482 B2 | 4/2004 | Sato et al. ....................... 714/4 |
| 6,751,459 B1 | 6/2004 | Lee et al. .................... 455/445 |
| 6,760,324 B1 | 7/2004 | Scott et al. .................. 370/352 |
| 6,760,416 B1 | 7/2004 | Banks et al. ................ 379/114 |
| 6,775,269 B1 * | 8/2004 | Kaczmarczyk et al. ...... 370/352 |
| 6,847,634 B1 * | 1/2005 | Pearce et al. ................ 370/352 |
| 7,145,899 B1 * | 12/2006 | Pearce et al. ................ 370/352 |
| 7,180,889 B1 * | 2/2007 | Kung et al. ................. 370/352 |
| 7,260,060 B1 * | 8/2007 | Abaye et al. ................ 370/230 |
| 7,339,924 B1 * | 3/2008 | Chung et al. ................ 370/356 |
| 7,359,368 B1 * | 4/2008 | Pearce ....................... 370/352 |
| 7,412,051 B1 * | 8/2008 | Beathard et al. ............ 379/219 |
| 2002/0150080 A1 | 10/2002 | Bhattacharya et al. |

* cited by examiner

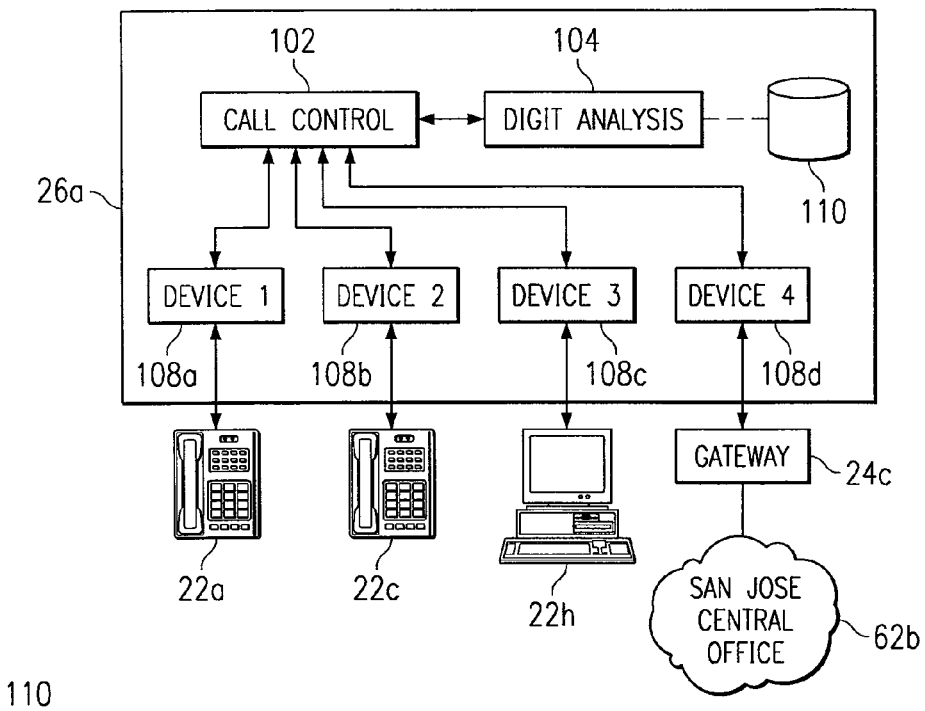

SYSTEM AND METHOD FOR PROVIDING SHARED LINE APPEARANCES IN A DISTRIBUTED CALL ROUTING NETWORK

CROSS-REFERENCE TO RELATED APPLICATIONS

This application is a continuation of U.S. application Ser. No. 09/579,002 filed May 25, 2000 and entitled "System and Method for Providing Shared Line Appearances in a Distributed Call Routing Network".

This application is related to the following commonly-owned applications:

U.S. application Ser. No. 09/579,348 filed May 25, 2000 and entitled "System And Method For Device Registration Replication In A Communication Network";

U.S. application Ser. No. 09/579,331 filed May 25, 2000 and entitled "System And Method For Routing Calls Across Call Managers Using A Route Plan"

U.S. application Ser. No. 09/579,399 filed May 25, 2000 and entitled "System And Method For Routing Calls Using Dialing Partitions"; and U.S. application Ser. No. 09/579,330 filed May 25, 2000 and entitled "System And Method For Distributed Call Routing".

TECHNICAL FIELD OF THE INVENTION

This invention relates generally to the field of telecommunications, and more specifically to a system and method for providing shared line appearances in a distributed call routing network.

BACKGROUND OF THE INVENTION

Historically, telecommunications have involved the transmission of voice and fax signals over a network dedicated to telecommunications, such as the Public Switched Telephone Network (PSTN) or a Private Branch Exchange (PBX). Similarly, data communications between computers have also historically been transmitted on a dedicated data network, such as a local area network (LAN) or a wide area network (WAN). Currently, telecommunications and data transmissions are being merged into an integrated communication network using technologies such as Voice over Packet (VoP). Since many LANs and WANs transmit computer data using packet protocols, such as the Internet Protocol (IP), VoP uses this existing technology to transmit voice and fax signals by converting these signals into digital data and encapsulating the data for transmission over a packet-based network.

SUMMARY OF THE INVENTION

In accordance with the present invention, a system and method for providing shared line appearances in a distributed call routing network is provided that substantially eliminates or reduces disadvantages or problems associated with previously developed systems and methods. In particular, the present invention contemplates a system and method for routing calls to telephony devices sharing a line appearance and controlled by different call managers in a packet-based network.

In one embodiment of the present invention, a method for routing calls in a packet-based network includes receiving a call request at a first call manager from a device that is coupled to the packet-based network. The call request includes a telephone number associated with a plurality of telephony devices that are coupled to the packet-based network and that are controlled by a number of call managers. The method also includes determining a line control process associated with the telephone number that is included in the call request and communicating the call request to the line control process. The method further includes determining a device process controlling each telephony device that is associated with the telephone number included in the call request and communicating the call request from the line control process to the device processes.

In another embodiment of the present invention, a call manager for routing calls in a packet-based network includes a first device process that controls a first device coupled to the packet-based network and that receives a call request from the device. The call request includes a first telephone number associated with a plurality of telephony devices that are coupled to the packet-based network and that are controlled by a plurality of call managers. The call manager also includes a control module that receives the call request from the first device process, and a digit analysis module that receives the first telephone number from the call control module. The digit analysis module determines the location of a line control process associated with the first telephone number and communicates the location of the line control process to the call control module. The call manager further includes a line control process that receives the call request from the call control module and determines the location of a plurality of device process that each control a telephony device associated with the first telephone number. The line control process communicates the call request to the device processes.

Technical advantages of the present invention include a system and method that enable the sharing of a line appearance between telephony devices that are controlled by different call managers in a packet-based network. Using the present invention, calls to a particular telephone number may be routed simultaneously or sequentially to multiple telephony devices having a line appearance for that telephone number. This call routing is possible even though the multiple telephony devices are controlled by multiple call managers.

The present invention allows a large degree of flexibility in organizing and maintaining a packet-based network having multiple call managers. For example, since telephony devices sharing a line appearance may be controlled by different call managers, if a telephony device loses it connection to a call manager, the telephony devices can dynamically and automatically reregister with a different call manager without concern regarding the effect on a shared line appearance. Furthermore, telephony devices sharing a line appearance can be instructed to register with different call managers to provide load balancing between multiple call managers.

Other technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description, taken in conjunction with the accompanying drawings, in which:

FIG. 2 illustrates an exemplary call manager in accordance with one embodiment of the present invention;

FIG. 3 illustrates an exemplary registration information table maintained by a call manager in accordance with one embodiment of the present invention;

FIG. 7 illustrates a registration information table 110a including line control process PIDs;

DETAILED DESCRIPTION OF THE INVENTION

Figure 1:
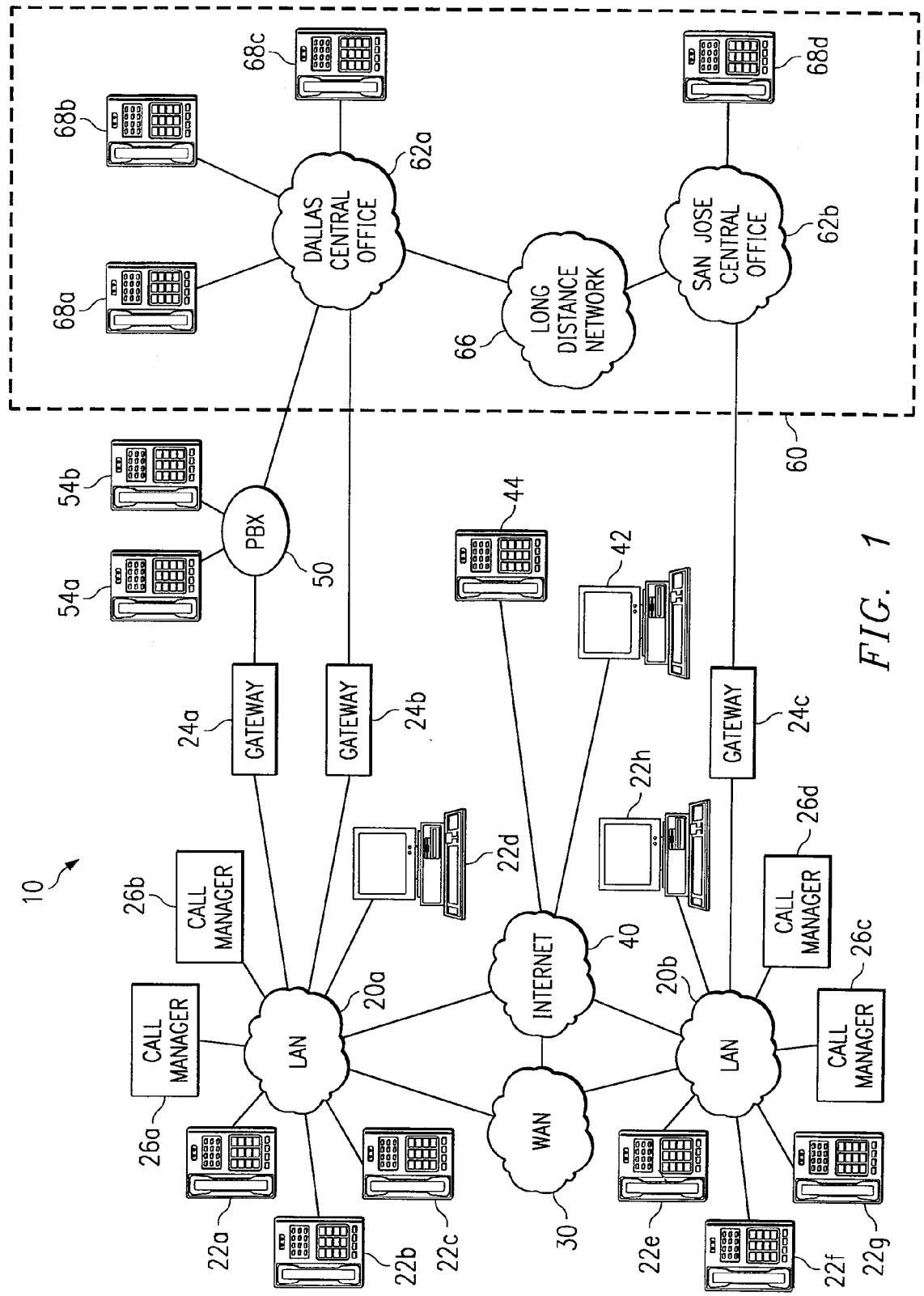
FIG. 1 illustrates an exemplary communication network in accordance with one embodiment of the present invention.

FIG. 1 illustrates an exemplary communication network 10. Although a specific communication network is illustrated in FIG. 1, the term "communication network" should be interpreted as generically defining any network capable of transmitting telecommunication signals, data, and/or messages. In the illustrated embodiment, communication network 10 includes a plurality of local area networks (LANs) 20 interconnected using a wide area network (WAN) 30. Each LAN 20 is a computer data network that is further operable to transmit audio and/or video telecommunication signals. In a particular embodiment, LANs 20 are Internet Protocol (IP) networks. However, LANs 20 may be any type of network that allows the transmission of audio and video telecommunication signals and data, as well as traditional data communications. Therefore, although subsequent description will primarily focus on IP communications, it should be understood that other appropriate method of transmitting telecommunications over a data network, such as a Frame Relay, ATM, or other packet-based network, are also included within the scope of the present invention.

LANs 20 may be directly coupled to other IP networks including, but not limited to, WAN 30 and any IP networks coupled to WAN 30 (such as other LANs 20 or the Internet 40). Since all IP networks share a common method of transmitting data, telecommunication signals may be transmitted between telephony devices located on different, but interconnected, IP networks. In addition to being coupled to other IP networks, LANs 20 may also be coupled to non-IP telecommunication networks through the use of gateway devices 24. For example, LAN 20a is coupled to a private branch exchange (PBX) 50 through a gateway device 24a. PBX 50 includes a plurality of extension telephones or subscriber sets 54a and 54b to which PBX 50 directs incoming telephone calls. Gateway device 24a may be either an analog or a digital gateway device depending on the type of PBX 50 to which it is coupled.

Another non-IP network to which LANs 20 may be coupled is the Public Switched Telephone Network (PSTN) 60. PSTN 60 includes switching stations, central offices, mobile telephone switching offices, pager switching offices, remote terminals, and other related telecommunications equipment that are located across the country. For example, central offices (COs) 62 connect telephone customers, such as residences and businesses, to PSTN 60. In the illustrated embodiment, LANs 20 are coupled to selected central offices 62 through the use of gateway devices 24b and 24c. The operation of the gateway devices 24 in communication network 10 is described in further detail below.

Central offices 62 are coupled through a long distance network 66 that allows communication between residences and businesses coupled to central offices in different areas, such as central office 62a in Dallas and central office 62b in San Jose. The entity that owns the communication lines comprising long distance network 66 (there are typically several different entities, each having their own communication lines) charges a fee for the use of these lines. However, one advantage of IP telephony is that a company owning (or leasing) LANs 20 and WAN 30 may avoid such fees by using WAN 30 to transmit calls between LANs 20 in different areas. Internet 40 may also be used to transmit calls.

IP networks and other packet-based networks transmit data (including voice and video data) by placing the data in packets and sending each packet individually to the selected destination. Unlike a circuit-switched network (like PSTN 60), dedicated bandwidth is not required for the duration of a call or fax transmission over LANs 20, WAN 30 or Internet 40. Instead, each telephony device sends packets across the network as they become available for transmission. This feature makes bandwidth available for other data when voice or fax data is not being transmitted.

The technology that allows telecommunications to be transmitted over an IP network (as well as other packet-based networks) may be referred to as Voice over Packet (VoP). IP telephony devices 22 have the capability of encapsulating a user's voice (or other media inputs) into IP packets so that the voice can be transmitted over LANs 20, WAN 30 and/or Internet 40. IP telephony devices 22 may include telephones, fax machines, computers running telephony software (such as MICROSOFT NETMEETING), gateway devices, H.323-compatible devices, or any other device capable of performing telephony functions in an IP network.

Communication network 10 includes a plurality of call managers 26 that control one or more IP telephony devices 22. A call manager 26 is an application that controls call processing, routing, telephone features and options (such as call hold, call transfer and caller ID), device configuration, and other telephony functions and parameters within communication network 10. A call manager 26 can control one or more of the IP telephony devices 22 coupled to the same LAN 20 to which it is coupled, and a call manager 26 may also control IP telephony devices 22 located elsewhere in communications network 10. For example, call manager 26a is capable of controlling telephony devices on LAN 20b. A call manager 26 may be implemented as software executing on one or more computers coupled to communication network 10. The call manager software may be embodied in any type of computer-readable medium including, but not limited to, hard drives, diskettes, CD-ROMs, DVD-ROMs, or other optical or magnetic storage devices.

When an IP telephony device 22 is connected to a LAN 20 or elsewhere in communication network 10 (or when it otherwise comes on-line), the telephony device 22 may be assigned an IP address using Dynamic Host Control Protocol (DHCP) or another similar protocol or technique. The telephony device 22 then registers with any call manager 26 with which it can communicate using its telephone number and its IP address. Alternatively, the telephony device 22 may request that it be assigned a telephone number and/or an IP address. The term "telephone number" should be understood to include any appropriate combination of digits or characters or any other appropriate method of identifying a telephony device. The telephony device may also report its Media Access Control (MAC) address and/or its device name. The call manager 26 with which a telephony device 22 has registered creates an internal device process, described below, that is used to route signaling to the telephony device 22 from call managers 26 or other telephony devices 22.

The ability of a call manager 26 to control any IP telephony device 22 in communication network 10 allows a call processing environment in which control of devices may distributed dynamically in response to changes in communication network 10. For example, if a call manager 26 goes off-line, the telephony devices 22 controlled by that call manager 26 can connect and register with an alternative call manager 26 in communication network 10. Likewise, if a communication link between a telephony device 22 and a call manager 26 goes down, the telephony device 22 may connect and register with an alternative call manager 26 to which there is an operable communication path. Furthermore, the distributed control of telephony devices 22 also provides for network scalability and load-sharing by allowing telephony devices 22 to be controlled by any call manager 26, regardless of physical location, in order to avoid excess load on a particular call manager 26 when new telephony devices 22 come on-line or to provide load balancing between call managers 26.

FIG. 2 illustrates an exemplary call manager 26a. It should be understood that any appropriate combination of telephony devices 22 and/or gateway devices 24 in communication network 10 may be controlled by call manager 26a. In the illustrated embodiment, call manager 26a controls telephony devices 22a and 22c, which are coupled to LAN 20a, and telephony device 22h and gateway device 24c, which are coupled to LAN 20b.

Call manager 26a includes a number of internal processes that are used to manage and control communication to and from devices 22, 24. These processes include, but are not limited to a call control module 102, a digit analysis module 104, and one or more device processes 108. Call control module 102 is responsible for establishing calls between multiple IP telephony devices 22 or between one or more IP telephony devices 22 and one or more external telephony devices, such as PBX telephony devices 54 and PSTN telephony devices 68.

In the illustrated embodiment, each device 22, 24 has an associated device process 108. Signaling to and from devices 22, 24 is first passed through the associated device process 108, which acts as a signaling contact point in call manager 26a to a device 22, 24. For example, signaling sent from call control module 102 of call manager 26a or signaling sent from another call manager 26 is directed to the appropriate device process 108, which then communicates the signaling to the appropriate device 22, 24. Likewise, signaling sent from a device 22, 24 is first sent to the associated device process 108, and is then communicated to the appropriate destination. Signaling between devices 22, 24 and between call managers may be performed using any appropriate signaling method including, but not limited to, Signal Distribution Layer (SDL) signaling links or tunneling trunks, as described below.

When a device 22, 24 coupled to a LAN 20 or any other appropriate location in communication network 10 comes on-line, the device 22, 24 registers with a call manager 26. As described above, a device 22, 24 can register with any call manager 26 with which the device 22, 24 can communicate by sending the call manager 26 a registration request. A call control module 102, or any other appropriate component of call manager 26, receives the registration requests. Call control module 102 (or another appropriate component) generates a device process 108 for the registering device 22, 24 and assigns the device process 108 a process identification number or string (PID).

Call control module 102 communicates the registering device's telephone number and the associated device process PID to digit analysis module 104. Digit analysis module 104 associates the telephone number and the PID in a registration information table 110 or any other appropriate database. Registration information table 110 may also include any other suitable registration information associated with the registering device 22, 24, such as the device name, IP address or MAC address of the device 22, 24.

When a device 22, 24 wishes to establish communications with another device in communication network 10, the device 22, 24 typically communicates one or more digits to the call manager 26 controlling device 22, 24. The digits identify the device with which communication is requested. For example, a telephony device 22 may send a call manager 26 one or more digits indicating the telephone number of an IP telephony device 22 or a non-IP telephony device (such as a PBX device 54 or a PSTN device 68) to initiate a telephone call with the device. Alternatively, a gateway device 24 may communicate one or more digits to a call manager 26 identifying an IP telephony device 22 with which a non-IP telephony device 54, 68 desires to communicate.

Digit inputs received by a call manager 26 are communicated to digit analysis module 104. Digit analysis module 104 may receive these digits directly from a device process 108, a call control module 102 (which received the digits from a device process 108) or any other suitable process in the same or a different call manager 26. Digit analysis module 104 translates the digit input it receives into the PID of the device process 108 that is associated with the device 22, 24 designated by the received digits. Digit analysis module 104 performs this translation using a table look-up in registration information table 110 or any other suitable process of determining the PID associated with the digits. The digits may be an internal telephone number (such a four-digit extension number), in which case the PID typically identifies a device process 108 associated with a telephony device 22. Alternatively, these digits may be an external telephone number (for example, a seven or ten digit North American Numbering Plan number or a PBX extension), in which case the PID may identify a device process 108 associated with a gateway device 24 or a process associated with a plurality of gateway devices 24. Digit analysis module 104 communicates the PID to the process that requested the digit analysis.

As an example, and not by way of limitation, assume that telephony device 22a communicates a call request including a digit string to device process 108a. The digit string is a telephone number of telephony device 22h. Device process 108a receives the digit string and communicates the digits to call control module 102. Call control module 102 communicates the digits to digit analysis module 104 to determine the PID of the device process 108 associated with the digits. Digit analysis module 104 performs a table look-up or any other suitable process of determining the PID associated with the digits (the PID of device process 108c) and communicates the PID to call control module 102. Call control module 102 may then communicate with device process 108c to initiate a call or other communication between telephony devices 22a and 22h, as is described below in further detail.

In the example above, the requested communication was between two telephony devices 22a and 22h controlled by call manager 26a. However, in many cases, devices 22, 24 controlled by different call managers 26 may wish to communicate. For example, due to the distributed nature of call managers 26 and the devices 22, 24 that they control, it is quite possible that two devices 22, 24 operated by a business may be controlled by two different call managers 26 located across the country from one another. Therefore, the registration information table 110 in a call manager 26 should have not only the PIDs (or other appropriate registration information) of the device processes 108 associated with the devices 22, 24 that the call manager 26 controls (local devices), but also the PIDs of device processes 108 associated with devices 22, 24 controlled by other call managers 26 (remote devices) with which communication might be desired.

As devices 22, 24 come on-line, go off-line or switch call managers 26, the registration table 110 in each call manager 26 needs to be updated. For this reason, each call manager 26 periodically communicates the telephone numbers and associated PIDs of the devices 22, 24 it controls to each of the other call managers 26. Each call manager 26 adds this information to the local device registration information in its registration information table 110.

FIG. 3 illustrates an exemplary registration information table 110 maintained by call manager 26a. Table 110 contains a list of digit strings 112 in a left column and a list of respective PIDs 114 of device processes 108 in a right column. In the illustrated embodiment, digit strings 112 include both internal four-digit telephone numbers and external telephone numbers (for example, telephone numbers associated with telephony devices 54, 68). The external telephone numbers are designated in table 110 by the notation "9@" (indicating the number nine preceding any digit string). These external telephone numbers could also include any other appropriate format (for example, external calls could be designated as "xxx-xxxx", "xxx-xxx-xxxx" or any other appropriate telephone number pattern which includes wildcards). For the purposes of this description, the term "telephone number" will be used to refer to specific telephone numbers (which include no wildcards) as well as telephone number patterns in which one or more digits are represented by a wildcard, such as "x".

In the illustrated embodiment, each PID 114 includes a node number (representing a call manager 26), a process name (identifying the type of process), and an instance number. For example, the PID '1.dp.3' may indicate the third device process 108 executed by the call manager 26 having a node number of '1'. Similarly, the PID '2.dp.1' indicates the first device process 108 executed by a second call manager having 26 a node number of '2'. Although a particular type of PID 114 is illustrated, any other method of identifying a device process 108 in a call manager 26 may be used. In addition, other appropriate processes associated with devices 22, 24 may also be identified in registration information table 110.

A PID 114 enables a call control module 102 (or another appropriate process) in one call manager 26 to directly communicate with a device process 108 in the same (local) call manager 26 or another (remote) call manager 26 in order to establish communication between two devices 22, 24. Registration information table 110 may contain the PIDs of many different types of processes executing at multiple call managers. This PID information provides a location or address at which a process may be signaled, even if that process is at a different call manager than the process or other component that is sending the signal. As will be described below, using registration information table 110, a telephone number received from a device 22, 24 may be resolved at the call manager 26 receiving the telephone number into a PID of a device process 108 (or other type of process) associated with a device 22, 24 identified by the telephone number. The device process 108 may then be directly signaled even though it may be executing at another call manager.

However, if direct signaling to a remote device process 108 is not available, PIDs 114 of remote device processes 108 may be replaced with just the node number of the remote call manager 26 executing the remote device process 108. In this case, call control module 102 (or another appropriate process) signals the remote call manager 26 with the telephone number of the device 22, 24 with which communication is desired. The call manager receiving the signaling then communicates the telephone number to its local digit analysis module 104, which determines the appropriate local PID. The local digit analysis module 104 communicates the PID to the local call control module 102, which then initiates (or attempts to initiate) the desired communication between devices 22, 24.

To keep the registration information table 110 at each call manager 26 updated, each call manager 26 may dynamically disseminate appropriate registration information associated with devices 22, 24 over which it has control. In addition, call managers 26 may monitor the status of other call managers 26 to determine whether to update or disseminate device registration information. In one embodiment, call managers 26 perform this dissemination and updating of registration information according to a set of four procedures, illustrated in FIGS. 4A-4D. These procedures provide for the updating of the information in the registration information table 110 of each call manager 26 each time a device 22, 24 or call manager 26 comes on-line or goes off-line.

Figures 4A, 4B:
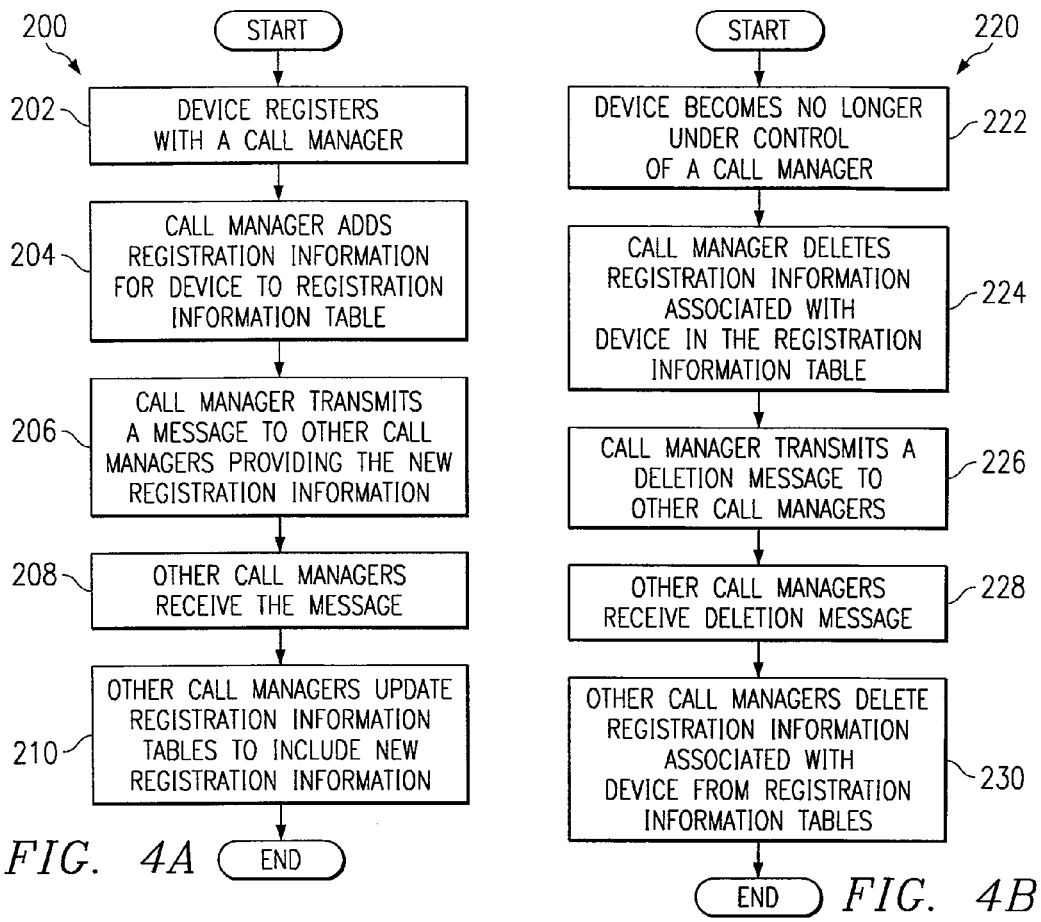
FIGS. 4A-4D illustrate exemplary procedures for updating registration information stored in a registration information table in accordance with one embodiment of the present invention.

FIG. 4A illustrates a first procedure 200 for updating registration information. Procedure 200 begins when device 22, 24 registers with and comes under the control of a call manager 26 at step 202. This includes a receipt of registration information from the device 22, 24 and the creation of a device process 108 associated with the registering device 22, 24. The controlling call manager 26 adds the appropriate registration information (for example, the device's telephone number and the PID of the associated device process 108) to its registration information table 110 at step 204 and communicates a message to all other active call managers 26 providing the registration information at step 206. The other call managers 26 receive this message at step 208, and each call manager 26 updates its registration information table 110 to include the new registration information at step 210. This dissemination of information according to procedure 200, as well as the three other procedures described below, may be made directly between digit analysis modules 104 of the active call managers 26.

FIG. 4B illustrates a second procedure 220 for updating registration information. Procedure 220 begins at step 222 when a device 22, 24 fails, is disconnected from communication network 10, unregisters with its controlling call manager 26, or is otherwise no longer under the control of a previously controlling call manager 26. The call manager 26 deletes the registration information associated with the device 22, 24 from its registration information table 110 at step 224 and communicates a deletion message to all other active call managers 26 indicating that the information has been deleted at step 226. The other call managers 26 receive this message at step 228 and delete the registration information associated with the device 22, 24 from their registration information table 110 at step 230. The deletion message sent when a device 22, 24 is no longer controlled by a particular call manager 26 and the registration information sent when a device registers (becomes under control) of a particular call manager 26 may both be generalized as types of status information sent by a call manager 26 when the call manager 26 becomes aware of a change in the control status of a device 22, 24.

A controlling call manager 26 may periodically poll the devices 22, 24 that it controls by sending out a polling message to determine when a device 22, 24 has failed, been disconnected from communication network 10, or is otherwise no longer able to be controlled by the call manager 26. If call manager 26 fails to receive a response to a polling message from a device 22, 24, call manager 26 determines that the non-responding device 22, 24 is no longer under its control. Alternatively, call manager 26 may expect a regular "heartbeat" from each device 22, 24 registers with call manager 26. If a registered device 22, 24 does not send a heartbeat, call manager 26 determines that the device 22, 24 is no longer under its control.

Figures 4C, 4D:
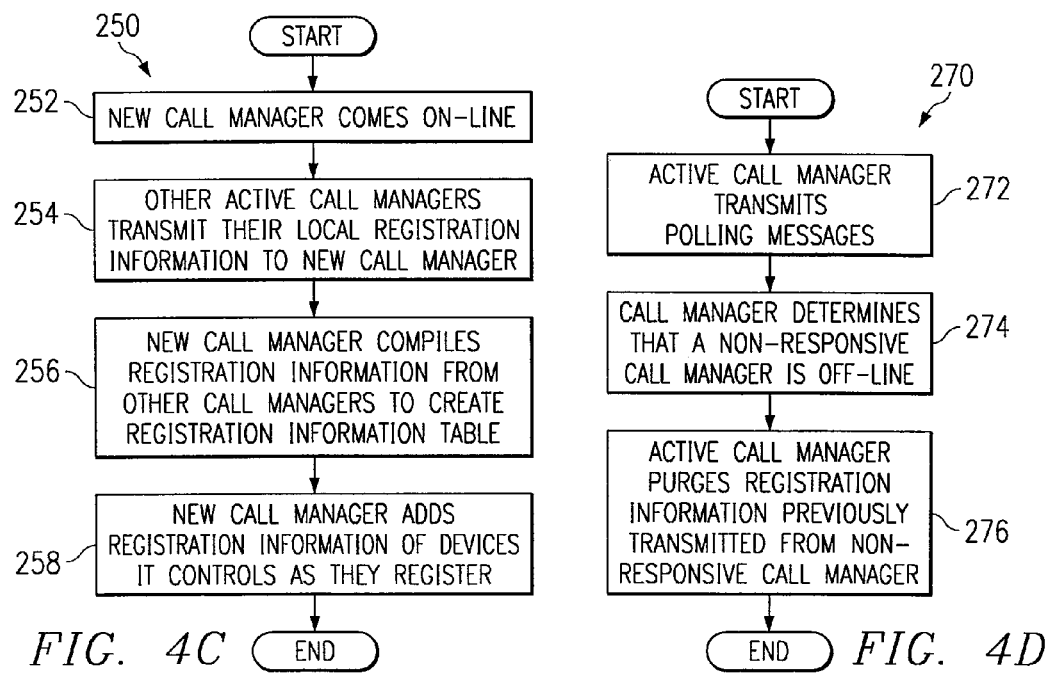

FIG. 4C illustrates a third procedure 250 for replicating registration information. Procedure 250 begins when a new call manager 26 is connected to communication network 10 and comes on-line at step 252. When the new call manager 26 is detected, the other active call managers 26 communicate their local registration information (the information associated with the devices 22, 24 that a call manager 26 controls) to the new call manager 26 at step 254. Call managers 26 may detect the presence of a new call manager 26 in communication network 10 by periodically communicating polling messages over communication network 10 and determining whether a new call manager 26 has responded. The new call manager 26 compiles the registration information sent by the other call managers 26 to create its own registration information table 110 at step 256. As devices 22, 24 register with the new call manager 26, the new call manager 26 adds local registration information to the remote registration information received from the other call managers 26 at step 258.

The combination of the local and remote registration information may be referred to as composite registration information. This composite registration is stored in registration information table 110. The registration information table 110 of a call manager 26 may include one or more flags indicating which entries in that particular registration information table 110 comprise local registration information, so that the call manager 26 storing the registration information table 110 will know which entries to replicate to new call managers 26. Alternatively, a call manager 26 may determine which entries comprise local registration information based on the node number or PID included in the entry.

FIG. 4D illustrates a fourth procedure 270 for replicating registration information when a call manager 26 has gone off-line (for example, when it has failed, is disconnected from communication network 10, or is unable to communicate with one or more of the other active call managers 26). Procedure 270 begins with each active call manager 26 communicating polling messages to each of the other active call managers 26 at step 272. A call manager 26 determines that a previously active call manager 26 (for example, a call manager 26 that previously responded to polling messages) has gone off-line at step 274 when the previously active call manager 26 fails to respond to the polling message. The active call manager 26 purges the registration information stored in its registration information table 110 that was previously communicated by the non-responsive call manager 26 (the non-responsive call manager's local registration information) at step 276. A similar process is performed by all other active call managers 26.

Although slow data transmission rates or other communication problems affecting the replication and updating procedures described above may cause inconsistencies between the registration information tables 110 of the active call managers 26, these inconsistencies are resolved over time without having a detrimental effect on the operation of call managers 26 and their control of devices 22, 24. As an example, assume that telephony device 22a, which is controlled by call manager 26a and has a telephone number or extension of '1000', is unable to communicate with call manager 26a due to a network failure. When call manager 26a fails to receive a polling response from telephony device 22a, call manager 26a deletes the registration information associated with telephony device 22a from its registration information table 110. Call manager 26a communicates a message to all active call managers 26 indicating that the information has been deleted according to procedure 220.

However, due to slow data transmission rates in portions of communication network 10, telephony device 22a is able to reregister with a call manager 26c as extension '1000' before the deletion message from call manager 26a reaches call manager 26c. Call manager 26c registers telephony device 22a and changes the PID that was associated with extension '1000' in its registration information table 110 from a remote PID (located at call manager 26a) to a local PID of a device process 108 that was created for telephony device 22. Call manager 26c communicates a message to all active call managers 26 providing the registration information according to procedure 200. When call manager 26c receives the deletion message from call manager 26a, call manager 26c ignores the deletion message since it no longer associates extension '1000' with a device process 108 at call manager 26a.

Alternatively, call manager 26c may not initially change the PID associated with extension '1000' when telephony device 22a registers with call manager 26c. Instead, call manager 26c may create a second entry associated with extension '1000'. The multiple entries are then resolved as described below in relation to call manager 26b.

In this example, a third call manager 26b is also active in communication network 10. Call manager 26b receives the registration message from call manager 26c before it receives the deletion message from call manager 26a. Call manager 26b adds the new registration information for extension '1000' in its registration information table accordingly. However, it does not remove the entry for extension '1000' associated with call manager 26a, since it has received conflicting information regarding the PID to be associated with extension '1000'. Typically, call manager 26b will eventually receive the deletion message from call manager 26a, and call manager 26b will then delete the extension '1000' entry associated with call manager 26a. However, if this deletion message is not received due to some type of network failure, the next time call manager 26b attempts to signal the device process 108 of call manager 26a associated with extension '1000', call manager 26a will inform call manager 26b that it no longer controls telephony device 22a. Call manager 26b then deletes the extension '1000' entry associated with call manager 26a in its registration information table 110. Therefore, the registration information tables 110 of call managers 26 eventually become consistent, and there is no disruption in performance during the interim.

Due in part to the digit analysis replication scheme described above, a dynamic, flexible, scalable and reliable IP telephony network is created in which the task of controlling a number of devices 22, 24 can be distributed seamlessly and dynamically between a number of call managers 26. A call manager 26 can control any device 22, 24 coupled to communication network 10 regardless of the respective geographic locations of the call manager 26 and the devices 22, 24. Therefore, in the event that a call manager 26 experiences communication problems, goes off-line, or reaches its device control capacity, the control of devices 22, 24 can be automatically distributed to other call managers 26, regardless of their physical location. Furthermore, the distribution of device control between call managers 26 can be dynamically changed without the intervention of a human administrator.

Figure 5:
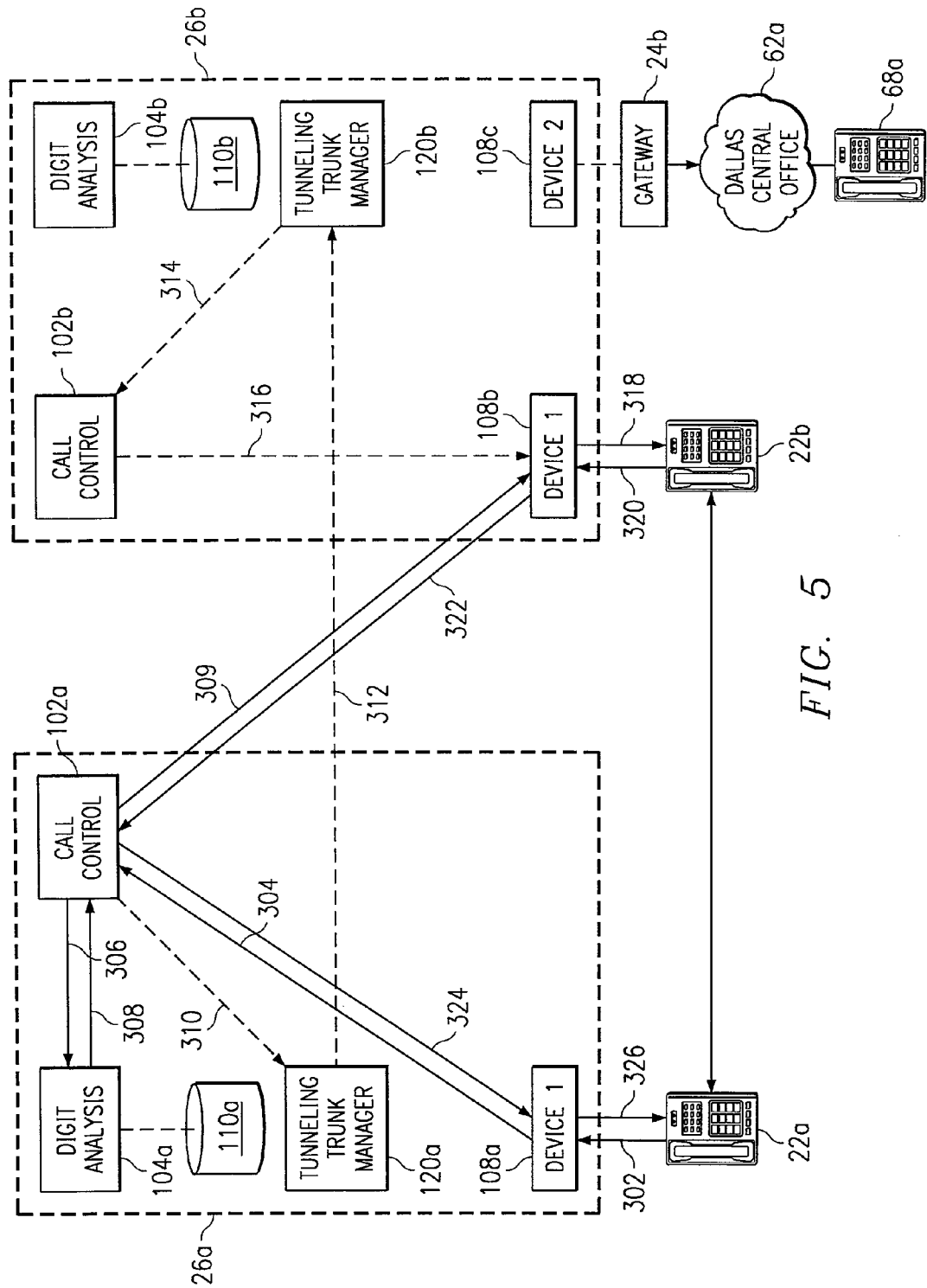
FIG. 5 illustrates an exemplary call routing process between call managers coupled to the communication network.

FIG. 5 illustrates an exemplary call routing process between call managers 26a and 26b in communication network 10. Although FIG. 5 illustrates call managers 26a and 26b and certain devices 22, 24 controlled by call managers 26a and 26b, it should be understood that this description applies to call routing between any devices 22, 24 controlled by any call manager(s) 26 in communication network 10. Furthermore, although FIG. 5 illustrates a series of communications between different modules or processes in call managers 26a and 26b, other appropriate intermediary modules or processes may be involved in these communications, and the functions of one or more of the described modules or processes may be divided between multiple components or combined in a single component.

When a user wishes to place a call from IP telephony device 22a to IP telephony device 22b in communications network 10, the calling telephony device 22a communicates a call request signal to its associated device process 108a executed by call manager 26a, as indicated by arrow 302. The call request signal indicates the telephone number of called telephony device 22b. Device process 108a communicates the call request to call control module 102a as indicated by arrow 304, and call control module 102a communicates the telephone number of called telephony device 22b to digit analysis module 104a as indicated by arrow 306. Call control module 102a may communicate the telephone number as a whole or it may communicate each digit of the telephone number successively. Digit analysis module 104a obtains device location information from registration information table 110a, and communicates this location information to call control module 102a, as indicated by arrow 308.

The type of location information that digit analysis module 104a communicates to call control module 102a depends on the signaling method used to communicate with device processes 108. As discussed above, if direct signaling between call control module 102a and device process 108b is used, then registration information table 110a includes a PID for device process 108b. In this case, digit analysis module 104a determines the PID associated with the telephone number in registration information table 110a (the PID of device process 108b) and communicates the PID to call control module 102a. Call control module 102a directly signals device process 108b with the call request (for example, using an SDL link), as indicated by arrow 309.

Alternatively, call control process 102a may communicate with call control process 102b using a tunneling trunk instead of communicating directly to device process 108b. This tunneling trunk may be, but is not limited to, a Transmission Control Protocol (TCP) or a User Datagram Protocol (UDP) connection between call manager 26a and call manager 26b. If a tunneling trunk is used, registration information table 110a associates the node number of call manager 26b (which may be included in a PID of device process 108b) with the telephone number of telephony device 22b. Digit analysis module 104a communicates the node number or complete PID to call control module 102a. As indicated by arrow 310, call control module 102a communicates the call request (including the node number or PID) to a tunneling trunk manager 120a that controls communication over the tunneling trunks connecting call manager 26a to the other call managers 26. Arrow 310 is dashed to indicate that the use of tunneling trunks is an alternative to direct signaling.

If the node number or PID indicates that the called device is controlled by call manager 26a (which is not the case in the illustrated embodiment), tunneling trunk manager 120 would return the call request to call control module 102a. Call control module 102a would signal the device process 108 associated with called telephony device 22b to indicate the call request from calling telephony device 22a.

If, as illustrated, the node number or PID indicates that called device 22b is remote from call manager 26a and controlled by call manager 26b, tunneling trunk manager 120a communicates the call request to a tunneling trunk manager 120b using a tunneling trunk set up between call managers 26a and 26b, as indicated by arrow 312. Tunneling trunk manager 120b communicates the call request to call control module 102b, as indicated by arrow 314. If a PID was communicated from call manager 26a (and thus the telephone number was resolved into the address of a device process 108 at call manager 26a), the PID is communicated to call control module 102b and the telephone number of telephony device 22b need not be sent from call manager 26a. Alternatively, if only a node number was communicated from call manager 26a, then call control module 102a may instruct tunneling trunk manager 120a to also send the telephone number of telephony device 22b to identify the telephony device 22 being called.

When call control module 102b receives the call request, call control module 102b either directly communicates with device process 108b based on a PID sent from call control module 102a, or call control module 102b communicates a telephone number sent by call manager 26a to digit analysis module 104b, which then returns the PID of device process 108b. Call control module 102b signals device process 108b to indicate the call request from calling telephony device 22a, as indicated by arrow 316.

Having received a call request signal from either call control module 102a or 102b (or from any other appropriate source) using either direct signaling or a tunneling trunk (or any other appropriate signaling method), device process 108b communicates the call request to called telephony device 22b, as indicated by arrow 318. If called telephony device 22b is available to communicate with calling telephony device 22a, called telephony device 22b communicates a call proceed signal to device process 108b, as indicated by arrow 320. The call proceed signal may be any appropriate communication that indicates a device's availability or desire to proceed with a communication. Device process 108b then communicates the call proceed signal to call control module 102a. Device process 108b may communicate this signal directly to call control module 102a using a direct signaling link, as indicated by arrow 322, or device process 108b may first communicate the signal to call control module 102b, which then communicates the signal to call control module 102a using the tunneling trunk, as described above.

Call control module 102a sets up the call by communicating the call proceed signal to device process 108a, as indicated by arrow 324. Device process 108a signals calling telephony device 22a, as indicated by arrow 326, and instructs telephony device 22a to establish media (audio and/or video) streaming with called telephony device 22b over a UDP connection, or any other suitable connection for transmitting media. A media streaming connection 328 may be directly between telephony devices 22a and 22b.

When media streaming connection 328 is established, the users of telephony devices 22a and 22b may begin to communicate. A codec (coder/decoder) in telephony devices 22a and 22b converts the media (for example, voice, video or fax) signals generated by the users of telephony devices 22a and 22b from analog signals into digitally encoded data. The codec may be implemented either in software or as special-purpose hardware in IP telephony devices 22a and 22b.

The digitally encoded data is encapsulated into IP packets so that it can be transmitted between telephony devices 22a and 22b. The encapsulation may be performed using Real-Time Transport Protocol (RTP) running over UDP, or any other suitable communication protocol. Once UDP has received and reassembled the IP packets at the destination telephony device 22, a codec in the destination telephony device 22 translates the digital data into analog audio and/or video signals for presentation to the user. The entire process is repeated each time that any call participant (or any other source) generates a media signal.

In addition to calls between IP telephony devices 22, calls can also be placed to and received from non-IP telephony devices 54, 68 that are connected to PBX 50, PSTN 60, or any other appropriate external network. Gateways 24 couple telephony devices 54, 68 to LANs 20 and convert analog or digital circuit-switched data transmitted from PBX 50 or PSTN 60 to packetized data transmitted by LANs 20, and vice-versa.

When a user of an IP telephony device 22a desires to place a call to an external telephony device, such as a PBX telephony device 54 or a PSTN telephony device 68, from IP telephony device 22a, calling telephony device 22a communicates a call request signal to its associated device process 108a. The call request signal indicates the telephone number of the called telephony device, for example PSTN telephony device 68a. As described above, device process 108a communicates the call request to call control module 102a, and call control module 102a communicates the telephone number of telephony device 68a to digit analysis module 104a.

Digit analysis module 104a communicates location information associated with the telephone number in registration information table 110a to call control module 102a. Since telephony device 68a is not an IP telephony device 22 controlled by a call manager 26, its telephone number (including a telephone number representing its telephone number, such as 'xxx-xxx-xxxx') may be associated in registration information table 110a with a process controlling one or more gateway devices 24 that provide access to PSTN 60. For example, the telephone number '214-xxx-xxxx' (214 being an area code in Dallas) may be associated with the PID or node number of a device process 108c controlling gateway 24b. Gateway 24b provides access to Dallas central office 62a (to which telephony device 68a is coupled). Alternatively, the telephone number may be associated with a route list control process that controls multiple gateway devices 24 by acting as an intermediary between a call control module 102 and the device processes 108 controlling each gateway device 24.

Assuming the telephone number or extension indicated in the call request from telephony device 22a is directly associated with device process 108c controlling gateway 24b (for example, there is no intermediate route list control process), the PID (or associated node number) of device process 108c is communicated from digit analysis module 104a to call control module 102a. Call control module 102a signals device process 108c using direct signaling, a tunneling trunk, or any other appropriate signaling method to indicate the call request and the telephone number of telephony device 68a. Process 108c communicates with gateway 24b, and gateway 24b interfaces with central office 62a to determine whether telephony device 68a can accept the call. If telephony device can accept the call, gateway 24b communicates a call proceed signal (through device process 108c) to device process 108a using direct signaling, a tunneling trunk, or any other appropriate signaling method. Telephony device 22a establishes a media streaming connection with gateway device 24b using UDP/IP or any other appropriate method.

As described above, a codec in telephony device 22a converts the media signals generated by the user of telephony device 22a from analog signals into digital encoded data. The digitally encoded data is encapsulated into IP packets. The IP packets are communicated to gateway device 24b and gateway device 24b converts the digital data to the analog or digital format used by the PSTN trunk to which gateway device 24b is coupled. Gateway device 24b signals central office 62a to direct the media from telephony device 22a to telephony device 68a. For media transmissions from PSTN telephony device 68a to IP telephony device 22a, the process is reversed. Gateway device 24b receives the incoming media transmissions (in either analog or digital form) and converts them into the digital format used for communications over LAN 20a. The digital data is then encapsulated into IP packets and transmitted over LAN 20a to IP telephony device 22a.

A similar process to that described above is used when a call is placed from PSTN telephony device 68a (or any other non-IP telephony device) to IP telephony device 22a. In this case, a user of telephony device 68a dials a telephone number that is associated in central office 62a with gateway device 24b. For example, the telephone number '214-555-xxxx' may be associated with gateway 24b (where 'xxxx' represents the extensions of one or more IP telephony devices 22). If telephony device 68a dials '214-555-1001', then central office 62a connects telephony device 68a with gateway 24b. Gateway 24b communicates the call request (including the telephone number dialed by the user of telephony device 68a, which gateway device 24b may or may not truncate to leave only the last four digits) to its device process 108c.

Device process 108c communicates the call request to call control module 102b, and call control module 102b communicates the telephone number to digit analysis module 104b. Digit analysis module 104b communicates location information for device process 108a that is associated with the telephone number to call control module 102b. Call control module 102b communicates the call request to device process 108a (through direct signaling, a tunneling trunk, or any other appropriate method), and device process 108a communicates the call request to telephony device 22a. If telephony device 22a accepts the call by sending a call proceed signal, media streaming is set up between telephony device 22a and gateway device 24b, and the call proceeds as described above (with gateway device 24b acting as an intermediary between telephony devices 22a and 68a).

In the call routing process described above in conjunction with FIG. 5, call requests were routed from a call control module 102 to a device process 108 (using either direct signaling or tunneling trunks) based on a PID or other location information of the device process 108 associated with the called telephone number in registration information table 110. This description assumed that there was only one device process 108 associated with a particular telephone number. However, it may be desirable for multiple telephony devices 22 to share a telephone number. For example, although the telephony devices 22 associated with an assistant and a manager may be assigned separate telephone numbers, the assistant's telephony device 22 may also be assigned the telephone number of the manager's telephony device 22. Therefore, when a call is placed to the manager's telephony device 22, both the manager's and the assistant's telephony device 22 will ring and be able to answer the call. This may be referred to as a shared line appearance. Since the control of telephony devices 22 may be distributed between multiple call managers 26, telephony devices that share a line appearance may be controlled by different call managers 26. Therefore, a system and method are needed that provide for the sharing of line appearances across call managers 26.

Figure 6:
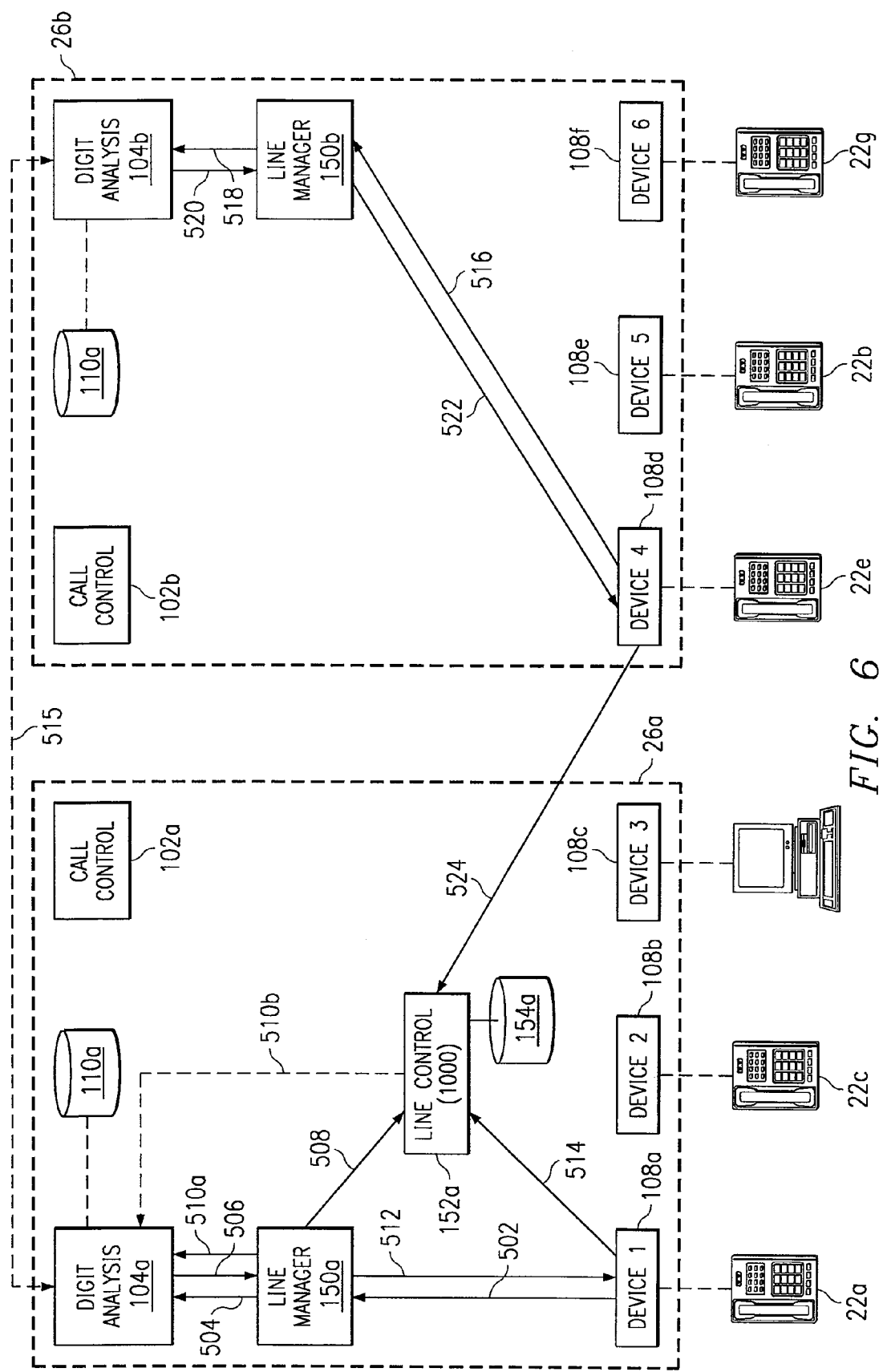
FIG. 6 illustrates a method of creating a line control process and registering telephony devices with the line control process.

FIG. 6 illustrates a method of creating a line control process 152 and registering telephony devices 22 with the line control process 152. After a telephony device 22, such as telephony device 22a, has registered with a call manager 26a and been assigned a device process 108a, telephony device 22a may request that one or more telephone numbers be associated with telephony device 22a as line appearances. Telephony device 22a communicates the requested telephone numbers to its associated device process 108a, and device process 108a communicates a line registration request for each telephone number to a line manager 150a. Line manager 150a is responsible for creating and managing line control processes 152 that manage each line appearance.

As an example, assume that device process 108a sends a single line registration request to line manager 150a requesting a line appearance associated with telephone number '1000', as indicated by arrow 502. When line manager 150a receives the line registration request from device process 108a, line manager 150a communicates the requested telephone number to digit analysis module 104a, as indicated by arrow 504, so that digit analysis module 104a may determine whether a line control process 152 has already been created and associated with telephone number '1000' in registration information table 110a. Assuming that digit analysis module 104a does not find a line control process 152 associated with telephone number '1000' in registration table 110a, digit analysis module 104a signals line manager 150a to indicate that a line control process 152 has not been created for telephone number '1000', as indicated by arrow 506. Line manager 150a sends a command that creates a line control process 152a for telephone number '1000', as indicated by arrow 508. Line manager 150a determines the PID or other location information associated with line control process 152a, and communicates this PID to digit analysis module 104a, as indicated by arrow 510a. Alternatively, line control process 152a may communicate its PID to digit analysis module 104a, as indicated by arrow 510b.

FIG. 7 illustrates a registration information table 110a including line control process PIDs 114. Digit analysis module 104a associates the PID 114 of line control process 152a with telephone number '1000' in registration information table 110a. This association is made in the same manner that telephone numbers were described above as being associated with the PIDs 114 of device processes 108a. A particular telephony device may have a first telephone number 112 that is associated with a line control process PID 114 in registration information table 110a and a second telephone number that is associated with a device process PID 114 in registration information table 110a. Furthermore, one or more device process PIDs 114 in registration information table 110a may be replaced by one or more line control process PIDs 114.

Line manager 150a communicates the PID or other location information associated with line control process 152a to device process 108a, as indicated by arrow 512. Device process 108a communicates a registration request, including the PID of device process 108a, to line control process 152a, as indicated by arrow 514. Line control process 152a stores the PID of device process 108a in a line control database 154a for use when routing calls placed to telephone number '1000,' as described below.

In the illustrated embodiment, a single line control process 152a controls the routing of calls to all telephony devices 22 having a line appearance associated with telephone number '1000'. Therefore, in order for telephony devices controlled by other call managers 26, such as call manager 26b, to register with line control process 152a, the location of line control process 152a should be replicated to all other call managers 26. Since telephone number '1000' is associated with the PID of line control process 152a in registration information table 110a, the replication of the information in registration information table 110a (as described above) provides all other call managers 26 with information about the existence and location of line control process 152a. This replication is indicated by arrow 515. Therefore, when a telephony device 22 controlled by a call manager other than call manager 26a requests a line appearance associated with telephone number '1000', the line manager 150 at the other call manager 26 will not attempt to create a new line control process 152, but will instead instruct the telephony device 22 to register with existing line control process 152a.

For example, assume that telephony device 22e registers with call manager 26b and requests to be registered with telephone number '1000'. Device process 108d controlling telephony device 22e sends a registration request to line manager 150b, as indicated by arrow 516. Line manager 150b communicates the telephone number to digit analysis module 104b, as indicated by arrow 518. Digit analysis module 104b determines whether a PID (or other location information) of a line control process 152 is associated with telephone number '1000' in registration information table 110b. Assuming that digit analysis module 104a has replicated the entry associated with line control process 152a from registration information table 110a, registration information 110b will list the PID of line control process 152a as associated with telephone number '1000'. Digit analysis module 104b determines the PID associated with telephone number '1000' (the PID of line control process 152a), and digit analysis 104b communicates this PID to line manager 150b, as indicated by arrow 520. Line manager 150b communicates the PID to device process 108d, as indicated by arrow 522, and device process 108d communicates a registration request (including the PID of device process 108d) to line control process 152, as indicated by arrow 524. Line control process 152a stores the PID of device process 108d in line control database 154a.

It was assumed in the above example that telephony device 22e requested a line appearance associated with telephone number '1000' after the PID of line control process 152a had been replicated to call manager 26b. However, if telephony device 22e had made this request before such replication (or if communication between call managers 26a and 26b is somehow prevented), then call manager 26b would have created a new line control process 152 for telephone number '1000' since it had no knowledge of a pre-existing line control process 152 for telephone number '1000'. In this case, each call manager 26a, 26b would replicate the entry in registration information table 110 for the local line control process 152 that it created.

Upon receiving a duplicate line control process entry for telephone number '1000', call managers 26 resolve the conflict by deleting the entry associated with the lower-ranked call manager 26. For example, the entry associated with the call manager 26 having the higher node number (or the lower node number) may be deleted. Any other appropriate method of choosing one of the line control processes 152 to be deleted may also be used. In any case, the telephony device(s) 22 registered with the line control process 152 to be deleted are instructed to reregister with the remaining line control process 152.

Figure 8:
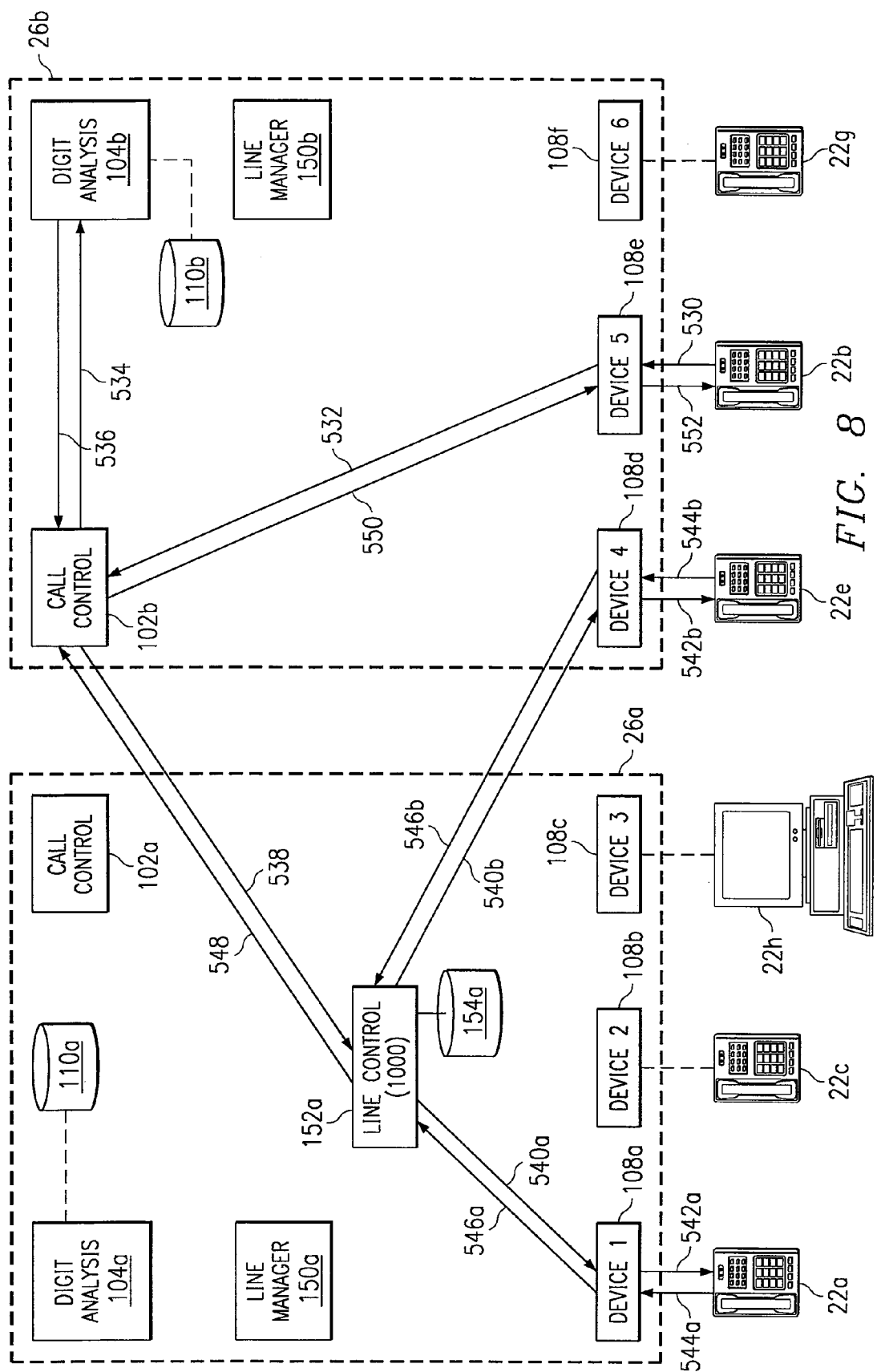
FIG. 8 illustrates an exemplary call routing process between call managers using the line control process of FIG. 6.

FIG. 8 illustrates an exemplary call routing process between call managers 26*a* and 26*b* using line control process 152*a*. Although FIG. 8 illustrates call managers 26*a* and 26*b* and certain devices 22, 24 controlled by call managers 26*a* and 26*b*, it should be understood that this description applies equally to call routing between any devices 22, 24 controlled by any call manager(s) 26 in communication network 10. Furthermore, although FIG. 8 illustrates a series of communications between different modules or processes in call managers 26*a* and 26*b*, other appropriate intermediary modules or processes may be involved in these communications, and the functions of one or more of the described modules or processes may be divided between multiple components or combined in a single component.

When a user wishes to place a call from IP telephony device 22*b* to telephony devices 22 having a line appearance associated with telephone number '1000', calling telephony device 22*b* communicates a call request signal (including the called telephone number) to its associated device process 108*e* executing in call manager 26*b*, as indicated by arrow 530. Device process 108*e* communicates the call request to call control module 102*b*, as indicated by arrow 532, and call control module 102*b* communicates the called telephone number to digit analysis module 104*b*, as indicated by arrow 534. Call control module 102*b* may communicate the telephone number as a whole or it may communicate each digit of the telephone number successively. Digit analysis module 104*b* obtains the PID (or other location information) of line control process 152*a* associated with telephone number '1000' in registration information table 110*b*, and communicates this location information to call control module 102*b*, as indicated by arrow 536.

The type of location information that digit analysis module 104*b* communicates to call control module 102*b* depends on the signaling method used. As described above, if direct signaling is used, then registration information table 110*b* includes a PID for line control process 152*a*. If tunneling trunks are used, then registration information table 110 includes an identifier of the node number of call manager 26*a* (where line control process 152*a* is executing). For the purposes of this description, it will be assumed that direct signaling is used, however, any other appropriate method of signaling or other communication may also be used. Therefore, digit analysis module 104*b* communicates the PID of line control process 152*a* to call control module 102*b*. Call control module 102*b* communicates the call request to line control process 152*a*, as indicated by arrow 538.

When line control process 152*a* receives the call request, it accesses line control database 154*a* to determine the PID of each device process 108 that has registered with line control process 152*a*. Line control process 152*a* communicates the call request to each of these device processes 108 using the PIDs in line control database 154*a*. Therefore, line control process 152*a* communicates the call request to device process 108*a*, as indicated by arrow 540*a*, and to device process 108*d*, as indicated by arrow 540*b*. Line control process 152*a* may communicate the call request to each registered device process 108 either substantially simultaneously ("in parallel") or sequentially ("in series"). If sent in series, line control process 152*a* may wait to receive a response to the call request from a device process 108 before communicating the call request to the next device process 108.

As described above, device processes 108*a* and 108*d* communicate the call request to their respective telephony devices 22*a* and 22*e*, as indicated by arrows 542. If either called telephony device 22*a* or 22*e* is available to communicate with calling telephony device 22*b*, called telephony device 22*a* and/or 22*e* communicates a call proceed signal (indicating that telephony device(s) 22*a* and/or 22*e* can accept the call) to its respective device process 108*a* or 108*d*, as indicated by arrows 544. Device processes 108*a* and 108*d* communicate the call proceed signal to line control process 152*a*, as indicated by arrows 546. Line control process 152*a* communicates the call proceed signal(s) to call control module 102*b*, as indicated by arrow 548. If call requests were communicated to device processes 108*a* and 108*d* in parallel, and if telephony devices 22*a* and 22*e* both accepted the call, line control process 152*a* may communicate the call proceed signal from the telephony device 22 that accepted the call first. Alternatively, line control process 152*a* may communicate both call proceed signals to call control module 102*b* so that a three-way call may be set-up.

Call control module 102*b* sets up the call by communicating a call proceed signal to device process 108*e*, as indicated by arrow 550. Device process 108*e* signals telephony device 22*b*, as indicated by arrow 552, and instructs telephony device 22*b* to establish media streaming with called telephony device(s) 22*a* and/or 22*e* to establish the call as described above.

Figure 9:
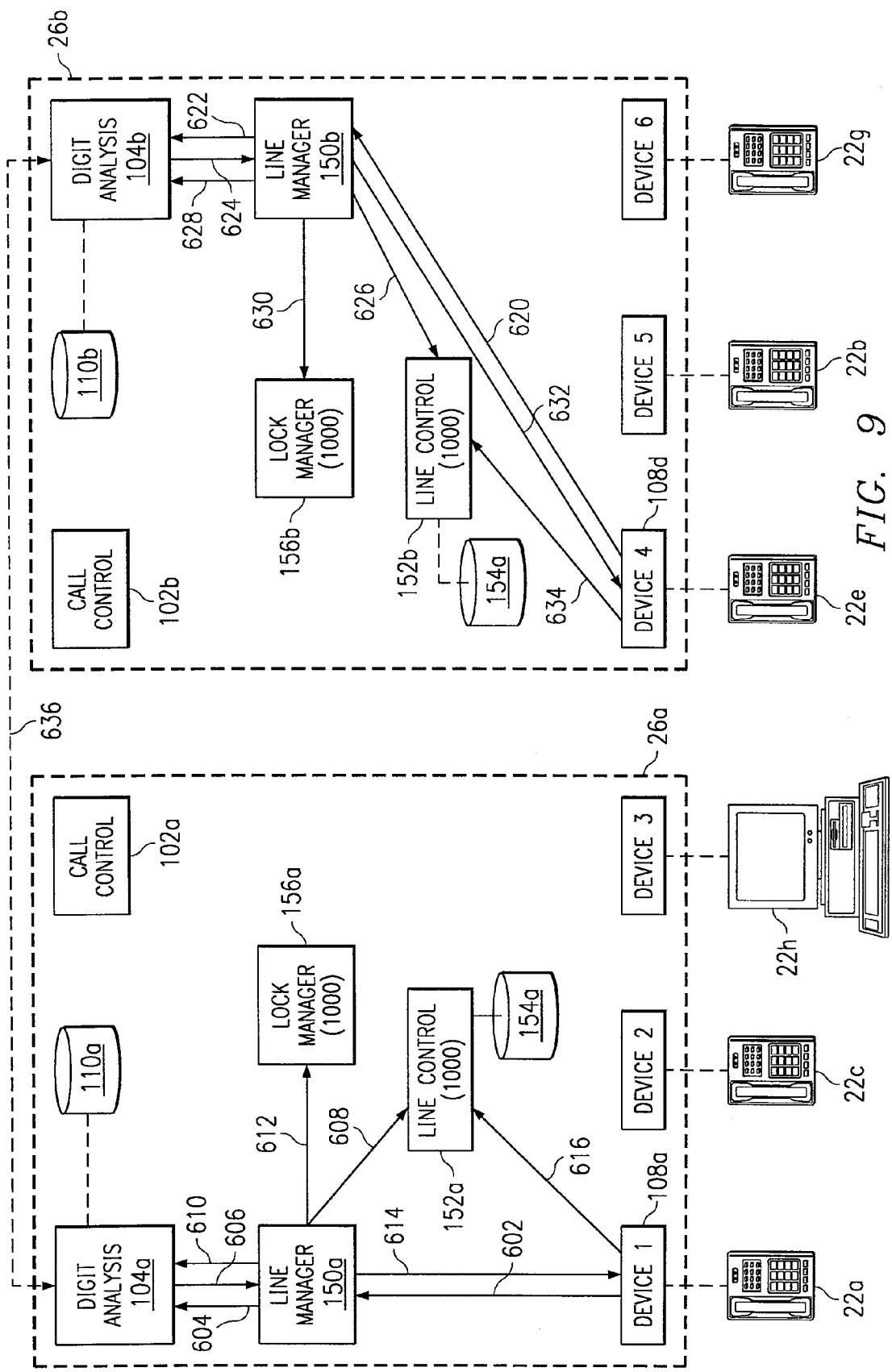
FIG. 9 illustrates an alternative method of creating line control processes and registering telephony devices with the line control processes.

FIG. 9 illustrates an alternative method of creating line control processes 152 and registering telephony devices 22 with the line control processes 152. The method of registering and routing calls described above involved the use of a single line control process 152*a* to register telephony devices 22 with a particular telephone number and to direct calls to that telephone number. However, in the embodiment illustrated in FIG. 9, a line control process 152 for a particular telephone number is created at each call manager 26 which receives a request from a telephony device 22 to be associated with the telephone number.

As an example, assume that telephony device 22*a* communicates a request to be associated with telephone number '1000'. Device process 108*a* sends a line registration request to line manager 150*a* indicating the requested line appearance for telephone number '1000', as indicated by arrow 602. Line manager 150*a* communicates the requested telephone number to digit analysis module 104*a*, as indicated by arrow 604, so that digit analysis module 104*a* may determine whether a local line control process 152 (a line process 152 executing in call manager 26*a*) has already been created and associated with telephone number '1000'. Assuming that digit analysis module 104*a* does not find a local line control process 152 at call manager 26*a* associated with telephone number '1000', digit analysis module 104*a* signals line manager 150*a* to report this as indicated by arrow 606.

Line manager 150*a* sends a command that creates a local line control process 152*a* for telephone number '1000', as indicated by arrow 608. Line manager 150*a* determines the PID or other location information associated with the local line control process 152*a*, and communicates this PID to digit analysis module 104*a*, as indicated by arrow 610. Alternatively, line control process 152*a* may communicate its PID to digit analysis module 104*a*. Digit analysis module 104*a* associates this PID with telephone number '1000' in registration information table 110*a*. This association is made in the same manner that telephone numbers are associated with PIDs of device processes 108*a*, as described above. Line manager 150*a* also sends a command to create a lock manager 156*a* associated with line control process 152*a*, as indicated by arrow 612. The purpose of lock manager 156*a* is described below.

Line manager 150a communicates the PID or other location information associated with line control process 152a to device process 108a, as indicated by arrow 614. Device process 108a then sends a registration request, including the PID of device process 108a, to line control process 152a, as indicated by arrow 616. Line control process 152a stores the PID of device process 108a in a line control database 154a.

In summary, the registration process for telephony device 22a illustrated in FIG. 9 is similar to the registration process for telephony device illustrated in FIG. 6. One difference is that a lock manager 156a is created and associated with line control process 152a. However, the registration process associated with a request from a second telephony device 22e (controlled by call manager 26b) to be associated with telephone number '1000' is somewhat different than the process described in FIG. 6 in conjunction with the registration of telephony device 22e. The difference stems from the fact that a line control process 152 for telephone number '1000' is created at each call manager 26 at which a telephony device 22 requests registration with telephone number '1000'. Therefore, the registration process, as illustrated in sequence by arrows 620-634, is similar to the registration process of telephony device 22a in FIG. 9.

Assuming that another telephony device 22 controlled by call manager 26b has not already requested to be registered with telephone number '1000', and thus a line control process 152 for telephone number '1000' has not been created at call manager 26b, the registration process illustrated by arrows 620-634 includes the creation of a line control process 152b and an associated lock manager 156b, as described above. Thus, each call manager 26 controlling a telephony device 22 registered with telephone number '1000' has an associated line control process 152. Thereafter, if any additional telephony devices 22 controlled by call managers 26a or 26b were to request registration with telephone number '1000', line managers 150a or 150b, respectively, would register the telephony device 22 with the existing line control process 152a or 152b.

As with the single line control process 152a of the embodiment described in conjunction with FIG. 6, the PIDs of line control processes 152a and 152b of FIG. 9 are replicated from their respective call managers 26a and 26b using the registration information table replication process described above, as indicated by arrow 636. After such replication, the registration information table 110 of each call manager 26a and 26b will include the PIDs of line control processes 152a and 152b associated with telephone number '1000'. The PIDs of any other line control processes 152 created at other call managers 26 will also be included in the registration information table 110 of each call manager 26.

Figure 10:
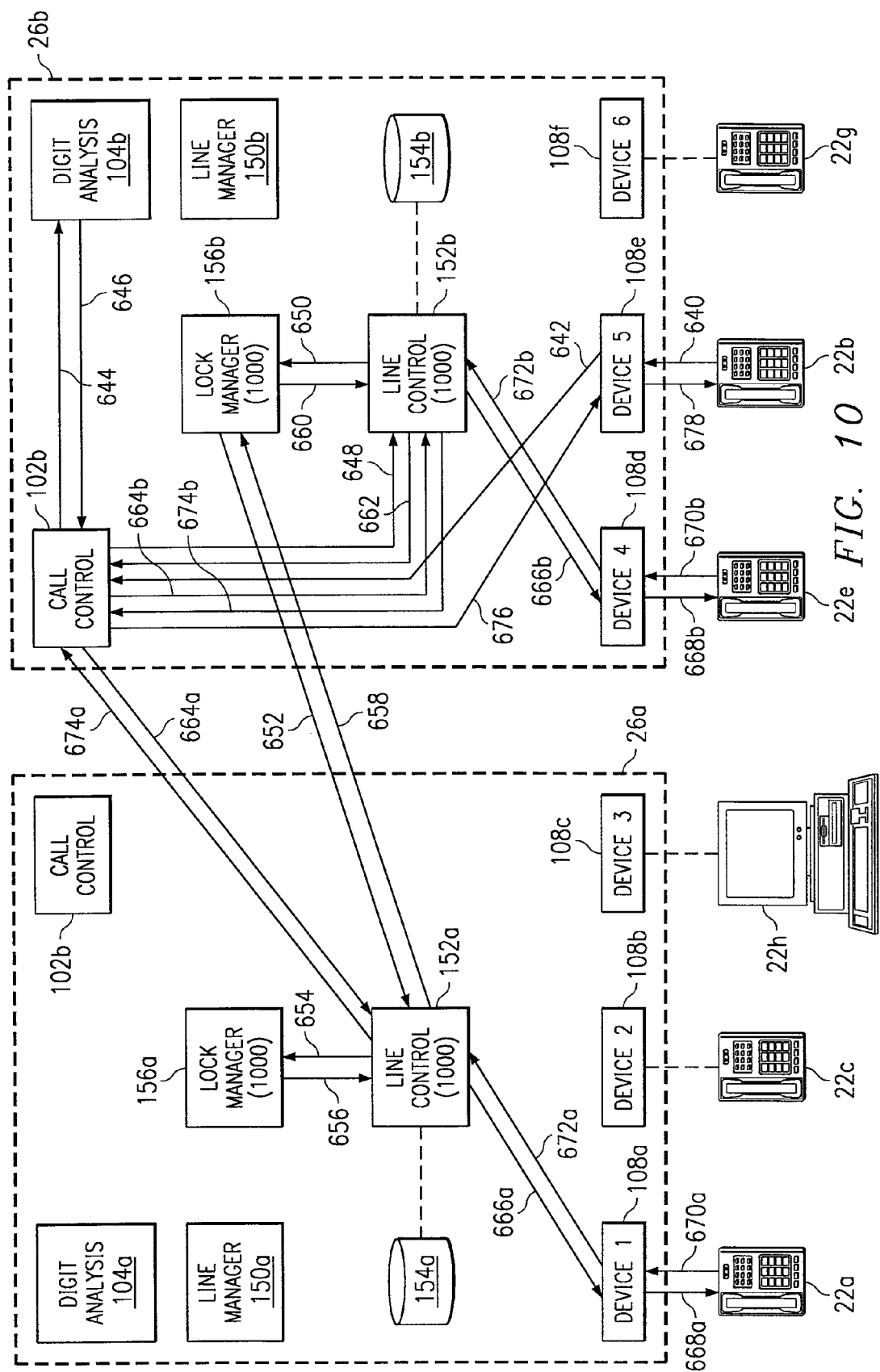
FIG. 10 illustrates an exemplary call routing process between call managers using the line control processes of FIG. 9.

FIG. 10 illustrates an exemplary call routing process between call managers 26a and 26b using line control processes 154a and 154b. As with FIG. 8, although FIG. 10 illustrates call managers 26a and 26b and certain devices 22, 24 controlled by call managers 26a and 26b, it should be understood that this description applies to call routing between any devices 22, 24 controlled by any call manager(s) 26 in communication network 10. Furthermore, although FIG. 10 illustrates a series of communications between different modules or processes in call managers 26a and 26b, other appropriate intermediary modules or processes may be involved in these communications, and the functions of one or more of the described modules or processes may be divided between multiple components or combined in a single component.

When a user wishes to place a call from IP telephony device 22b to telephony devices 22 having a line appearance associated with telephone number '1000', calling telephony device 22b communicates a call request signal including telephone number '1000' to its associated device process 108e executing in call manager 26b, as indicated by arrow 640. Device process 108e communicates the call request to call control module 102b as indicated by arrow 642, and call control module 102b communicates the called telephone number to digit analysis module 104b, as indicated by arrow 644. Call control module 102b may communicate the telephone number to digit analysis module 104b as a whole or it may communicate each digit of the telephone number successively. Digit analysis module 104b obtains the PID or other location information associated with telephone number '1000' in registration information table 110b (in this example, the PIDs of line control processes 152a and 152b), and communicates this location information to call control module 102b, as indicated by arrow 646.

Call control module 102b communicates the call request to the line control process 152 whose PID is listed first in registration information table 110b. Call control module 102b also communicates the PIDs of any other line control processes 152 associated with telephone number '1000' in registration information table 110b. For example, assume that line control process 152b is listed first in registration information table 110b. Call control module 102b thus communicates the call request and the PID of line control process 152a to line control process 152b, as indicated by arrow 648. Alternatively, call control module 102b could send the call request and the PID of line control process 152b to line control process 152a.

Line control processes 152a and 152b are locked during the processing of a call request so that if a second call request is initiated to telephone number '1000', the second call request will be put on hold until the first call request is resolved. Lock managers 156 are used to implement this locking scheme. After receiving the call request and PID of line control process 152a, line control process 152b communicates a lock request signal to its associated lock manager 156b, as indicated by arrow 650. This lock request signal includes the PID of line control process 152a. Lock manager 156b determines whether line control process 152b is already in a locked condition. If line control process 152b is not locked, lock manager 156b communicates a remote lock request signal to line control process 152a, as indicated by arrow 652. If other line control processes 152 were involved, lock manager 156b would also send remote lock requests to these line control processes 152.

Line control process 152a communicates the remote lock request to its associated lock manager 156a, as indicated by arrow 654, and lock manager 156a determines whether line control process 152a is in a locked condition. If line control process 152a is not already locked, lock manager 156a communicates a lock response signal to line control process 152a indicating that the remote lock request has been granted, as indicated by arrow 656. Line control process 152a communicates the lock response signal to lock manager 156b as indicated by arrow 658. Any other line control processes 152 to which a remote lock request was communicated from lock manager 156b would also return a lock response signal (after being locked as described above). Lock manager 156b communicates a lock response signal to line control process 152b indicating that the lock request has been granted by lock manager 156a, as indicated by arrow 660. Line control process 152b then communicates a signal to call control module 102b indicating that the call request may be processed, as indicated by arrow 662. If one or more line control processes 152 are already locked and do not grant the lock request, the call request may be placed on hold or communicated only to the line control processes 152 that granted the lock request.

Call control module 102b communicates the call request to line control processes 152a and 152b, as indicated by arrows 664a and 664b. Call control module 102b may communicate the call request to each line control process 152a, and 152b either substantially simultaneously ("in parallel") or sequentially ("in series"). If sent in series, call control process 102b may wait to receive a response to the call request from one line control process 152 before communicating the call request to the next line control process 152. Line control processes 152a and 152b communicate the call request to their associated device processes 108 using the PIDs stored in their respective line control databases 154a and 154b. In the illustrated embodiment, only one device process 108 is associated with each line control process, however, other telephony devices 22 controlled by the same call manager 26 in which the line control process 152 is executing may also be included in the associated line control database 154.

In the illustrated embodiment, line control process 152a communicates the call request to device process 108a, and line control process 152b communicates the call request to device process 108d, as indicated by arrows 666. Device processes 108a and 108d communicate the call request to their respective telephony devices 22a and 22e, as indicated by arrows 668. If either telephony device 22a or 22e is available to communicate with telephony device 22b, telephony device 22a or 22e communicates a call proceed signal to its respective device process 108a or 108d, as indicated by arrows 670. Device processes 108a and 108d communicate the call proceed signals to line control processes 152a and 152b, respectively, as indicated by arrows 672. Line control processes 152a and 152b then communicate the call proceed signals to call control module 102b, as indicated by arrows 674.

If call control module 102b communicated the call requests to line control processes 152a and 152b in parallel, and if telephony devices 22a and 22e both accept the call, call control module 102b may set up the call with the telephony device 22 from which call control module 102b first receives a call proceed signal. Alternatively, call control module 102b may set up a three-way call between telephony devices 22a, 22b and 22e. Call control module 102b sets up the call by communicating a call proceed signal (indicating that telephony devices 22a and/or 22e accepted the call) to device process 108e, as indicated by arrow 676. Device process 108e signals telephony device 22b, as indicated by arrow 678, and instructs telephony device 22b to establish media (audio and/or video) streaming with called telephony device(s) 22a and/or 22e, as described above, to establish the call.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims. For example, although certain modules, components, or processes in call managers 26 have been described, the functions of these modules, components, or processes may be performed by any module, component, or process of call managers 26 implemented as software or hardware.

What is claimed is:

1. A method for routing calls in a packet-based network, comprising:
    receiving a call request at a first call manager coupled to the packet-based network from a device coupled to the packet-based network, the call request including a telephone number associated with a plurality of telephony devices coupled to the packet-based network and controlled by a plurality of call managers;
    at the first call manager, determining a line control process associated with the telephone number included in the call request;
    communicating the call request to the line control process;
    at the first call manager, determining a device process controlling each telephony device associated with the telephone number included in the call request; and
    communicating the call request from the line control process to the device processes.

2. The method of claim 1, wherein receiving a call request at the first call manager from the device coupled to the packet-based network comprises receiving the call request from a telephony device coupled to the packet-based network.

3. The method of claim 1, wherein receiving a call request at the first call manager from the device coupled to the packet-based network comprises receiving a call request from a gateway device coupled to the packet-based network, the gateway device receiving the call request from a telephony device external to the packet-based network.

4. The method of claim 1, wherein communicating the call request to the line control process comprises communicating the call request to a line control process executing at a second call manager.

5. The method of claim 1, wherein:
    determining a device process controlling each telephony device comprises accessing a line control database associated with the line control process to determine a process identification (PID) of each device process; and
    communicating the call request from the line control process to the device processes comprises communicating the call request to the device processes using the PIDs of the device processes.

6. The method of claim 1, wherein:
    determining a line control process associated with the telephone number included in the call request comprises accessing a registration information table to determine a process identification (PID) of the line control process; and
    communicating the call request to the line control process comprises communicating the call request to the line control process using the PID.

7. The method of claim 1, further comprising:
    receiving a line registration request from a first telephony device requesting a line appearance associated with a first telephone number;
    determining that a line control process associated with the first telephone number has not been created; and
    creating a line control process associated with the first telephone number and operable to manage calls placed to the first telephone number.

8. The method of claim 7, further comprising:
    communicating the PID of the line control process to a first device process controlling the first telephony device;
    communicating the PID of the first device process to the line control process; and
    storing the PID of the first device process in a line control database associated with the line control process.

9. The method of claim 8, further comprising:
    receiving a line registration request from a second telephony device requesting a line appearance associated with the first telephone number;
    determining that a line control process associated with the first telephone number has already been created;

communicating the PID of the line control process associated with the first telephone number to a second device process controlling the second telephony device;

communicating the PID of the second device process to the line control process; and storing the PID of the second device process in the line control database associated with the line control process.

10. The method of claim 1, further comprising:

determining the location of a plurality of line control processes associated with the telephone number included in the call request, each line control process executing at a different call manager;

communicating the call request to the line control processes;

determining the location of at least one device process associated with each line control process, each device process controlling one of the telephony devices associated with the telephone number included in the call request; and communicating the call request from each line control process to the associated device process.

11. The method of claim 10, further comprising:

communicating the location of the plurality of line control processes to a first lock manager associated with a first line control process;

communicating a lock request signal from the first lock manager associated with the first line control process to each of the other line control processes associated with the telephone number included in the call request;

communicating the lock request signal from each of the other line control processes to an lock manager associated with each line control process;

receiving a lock response at each of the other line control process from the associated lock manager; and communicating the lock response from each line control process to the first lock manager.

12. The method of claim 11, wherein:

receiving a lock response at each line control process from the associated lock manager comprises receiving a response indicating the lock request has been granted; and communicating the call request to the line control processes comprises communicating the call request to the line control processes in response to receiving the lock response from each line control process at the first lock manager.

13. A call manager for routing calls in a packet-based network, comprising:

a first device process controlling a first device coupled to the packet-based network and operable to receive a call request from the first device, the call request including a first telephone number associated with a plurality of telephony devices coupled to the packet-based network and controlled by a plurality of call managers;

a call control module operable to receive the call request from the first device process;

a digit analysis module operable to:

receive the first telephone number from the call control module;

determine the location of a line control process associated with the first telephone number; and communicate the location of the line control process to the call control module; and the line control process operable to:

receive the call request from the call control module;

determine the location of a plurality of device processes, including the first device process, each device process controlling one of the telephony devices associated with the first telephone number; and communicate the call request to the device processes.

14. The call manager of claim 13, wherein the first device process controls a first telephony device coupled to the packet-based network and is operable to receive the call request from the first telephony device.

15. The call manager of claim 13, wherein the first device process controls a first gateway device coupled to the packet-based network and is operable to receive the call request from the first gateway device, the first gateway device having received the call request from an external telephony device external to the packet-based network.

16. The call manager of claim 13, wherein the line control process is further operable to:

access an associated line control database to determine a process identification (PID) of each device process controlling one of the telephony devices associated with the first telephone number; and communicate the call request to the device processes using the PIDs of the device processes.

17. The call manager of claim 13, further comprising a line manager operable to receive a line registration request from a telephony device requesting a line appearance associated with the first telephone number.

18. The call manager of claim 17, wherein:

the digit analysis module is further operable to receive the first telephone number from the line manager and to determine that the line control process associated with the first telephone number has not been created; and wherein the line manager is further operable to create a line control process associated with the first telephone number.

19. The call manager of claim 18, wherein:

the line manager is further operable to communicate a process identification (PID) of the line control process to a second device process controlling the second telephony device; and the line control process is operable to receive a PID of the second device process from the second device process and to store the PID of the second device process in a line control database associated with the line control process.

20. The call manager of claim 19, wherein the line control process is further operable to:

receive a PID of a third device process controlling a third telephony device requesting the line appearance associated with the first telephone number, the third device process executing at a second call manager and having received the PID of the line control process from the line manager executing at the second call manager; and store the PID of the third device process in the line control database associated with the line control process.

21. The call manager of claim 13, wherein:

the digit analysis module is further operable to access a registration information table to determine a process identification (PID) of the line control process; and the call control module is operable to communicate the call request to the line control process using the PID.

22. The call manager of claim 13, wherein the a digit analysis module is further operable to:

receive the first telephone number from the call control module;

determine the location of a plurality of line control processes associated with the first telephone number, each line control process executing at a different call manager; and communicate the location of each line control process to the call control module; and the call control module further operable to communicate the call request to the line control processes.

23. The call manager of claim 22, further comprising:

a first line control process associated with the first telephone number and operable to receive the location of the other line control processes associated with the first telephone number from the call control module; and a lock manager operable to:
receive the location of the other line control processes;
communicate a lock request signal to each of the other line control processes;
receive a lock response from each line control process indicating that a lock manager associated with each of the other line control processes has granted the lock request; and
communicate the lock response from each line control process to the first line control process.

24. The call manager of claim 23, wherein:

the first line control process is further operable to communicate a signal to the call control module indicating that the lock request has been granted by each of the plurality of line control process associated with the first telephone number; and the call control module is operable to communicate the call request to each of the line control processes in response to receiving the signal from the first line control process.

25. The call manager of claim 24, further comprising:

a second device process controlling a second device associated with the telephone number included in the call request; and wherein the first line control process is further operable to:
receive the call request from the call control module;
determine the location of a second device process; and
communicate the call request to the second device process.

26. A computer-readable medium comprising call manager software operable, when executed by a computer processor, to perform the following steps:

receive a call request from a device coupled to the packet-based network, the call request including a telephone number associated with a plurality of telephony devices coupled to a packet-based network and controlled by a plurality of call managers;

determine a line control process associated with the telephone number included in the call request;

communicate the call request to the line control process;

determine a device process controlling each telephony device associated with the telephone number included in the call request; and communicate the call request from the line control process to the device processes.

27. The computer-readable medium of claim 26, wherein communicating the call request to the line control process comprises communicating the call request to a line control process executed by a second call manager software.

28. The computer-readable medium of claim 26, further operable to:

receive a line registration request from a first telephony device requesting a line appearance associated with a first telephone number;

determine that the line control process associated with the first telephone number has not been created; and create the line control process associated with the first telephone number and operable to manage calls placed to the first telephone number.

29. The computer-readable medium of claim 28, further operable to:

communicate a process identification (PID) of the line control process to a first device process controlling the first telephony device;

communicate a PID of the first device process to the line control process; and store the PID of the first device process in a line control database associated with the line control process.

30. The computer-readable medium of claim 29, wherein:

creating the line control process comprises creating the line control process executed by the call manager software; and communicating the PID of the line control process to a first device process comprises communicating the PID of the line control process to a first device process executed by a second call manager software.

31. The computer-readable medium of claim 26, wherein:

determining a line control process associated with the telephone number included in the call request comprises accessing a registration information table to determine a process identification (PID) of the line control process; and communicating the call request to the line control process comprises communicating the call request to the line control process using the PID.

* * * * *

UNITED STATES PATENT AND TRADEMARK OFFICE
CERTIFICATE OF CORRECTION

PATENT NO. : 7,636,349 B2 Page 1 of 1
APPLICATION NO. : 11/559443
DATED : December 22, 2009
INVENTOR(S) : Christopher E. Pearce et al.

It is certified that error appears in the above-identified patent and that said Letters Patent is hereby corrected as shown below:

Title Page, Item (63) "Related U.S. Application Data" delete "Continuation of application No. 09/579,348" and insert -- Continuation of application No. 09/579,002 --.

Signed and Sealed this

Ninth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,636,349 B2
APPLICATION NO. : 11/559443
DATED : December 22, 2009
INVENTOR(S) : Pearce et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 307 days.

Signed and Sealed this

Ninth Day of November, 2010

David J. Kappos
*Director of the United States Patent and Trademark Office*